United States Patent
Wang et al.

(10) Patent No.: US 7,500,076 B2
(45) Date of Patent: Mar. 3, 2009

(54) MEMORY SPACE ALLOCATION METHODS AND IC PRODUCTS UTILIZING THE SAME

(75) Inventors: Chiang Wang, Taipei (TW); Gatien Song, Taipei (TW); Tianjie Kuo, Taipei (TW); Yuh-Dar Tseng, Taipei (TW)

(73) Assignee: Via Technologies, Inc., Taipei (TW)

( * ) Notice: Subject to any disclaimer, the term of this patent is extended or adjusted under 35 U.S.C. 154(b) by 140 days.

(21) Appl. No.: 11/037,992

(22) Filed: Jan. 18, 2005

(65) Prior Publication Data

US 2006/0036829 A1 Feb. 16, 2006

(30) Foreign Application Priority Data

Aug. 12, 2004 (TW) ............... 93124175 A

(51) Int. Cl.
*G06F 13/00* (2006.01)
(52) U.S. Cl. ..................... 711/170
(58) Field of Classification Search ......... 711/170, 711/156
See application file for complete search history.

(56) References Cited

U.S. PATENT DOCUMENTS

| 5,396,608 | A  | * | 3/1995 | Garde ................. 711/200 |
| 6,282,589 | B1 | * | 8/2001 | Porterfield et al. ......... 710/52 |
| 6,684,283 | B1 | * | 1/2004 | Harris et al. .............. 710/302 |
| 2006/0020744 | A1 | * | 1/2006 | Sinclair et al. ........... 711/103 |

FOREIGN PATENT DOCUMENTS

CN 1330273 1/2002

* cited by examiner

*Primary Examiner*—Kevin Verbrugge
*Assistant Examiner*—Eric S Cardwell
(74) *Attorney, Agent, or Firm*—Thomas, Kayden, Horstemeyer & Risley

(57) ABSTRACT

Memory allocation methods and IC products utilizing the same. A memory space with a continuous address is provided. A first memory address length is allocated to a first pin according to a data amount obtained through the first pin. A second memory address length allocated adjacent to the first memory address length is allocated to a second pin according to a data amount obtained through the second pin.

13 Claims, 3 Drawing Sheets

MEMORY SPACE ALLOCATION METHODS AND IC PRODUCTS UTILIZING THE SAME

BACKGROUND

The invention relates to data allocation methods, and more particularly, to methods for memory space allocation.

In conventional integrated circuit (IC) design, pins serve as signal interfaces for data transmission in chips. Typically, the size of a data bus is proportioned to the number of pins thereof. A Small Computer System Interface (SCSI) bus, for example, comprises sixty-eight pins, while an Industry Standard Architecture (ISA) bus comprises forty pins. Each pin is assigned a temporary memory space, such as a buffer or register, for data storage, and each temporary memory space has a fixed size.

FIG. 1 is a schematic diagram of memory space configuration in conventional IC design. A chip 10 comprises a data configuration module 110 and a plurality of pins 130. Data configuration module 110 comprises a control unit 111 and a plurality of memory spaces 113 corresponding to pins 130 respectively. Each memory space has the same fixed memory size. Control unit 111 receives data through a pin 130 and then temporarily stores the data in a memory space 113 corresponding to the pin. Further, control unit 111 can temporarily store data in a memory space 113 and then delivers the data out through a pin 130 corresponding to the memory space.

As described above, each memory space has the same memory size. When a large amount of data is obtained through a pin, the capacity of a corresponding memory space may be exceeded. In addition, when a small amount or no data is obtained through a pin, the corresponding memory space remains unoccupied that is insufficient. Thus, a method for efficient allocation of memory space is desirable.

SUMMARY

Memory allocation methods and IC products utilizing the same are provided exemplarily. Some embodiments of methods for memory space allocation comprise providing a memory space with a continuous memory address, allocating a first memory address length of the memory space to a first pin according to a data amount obtained from the first pin, and allocating a second memory address length of the memory space to a second pin according to a data amount obtained from the second pin.

Some embodiments of methods for memory space allocation comprise defining a plurality of I/O types of each of a plurality of pins and a plurality of configuration states corresponding to the I/O types of each pin, providing a memory space with a continuous memory address, and allocating a first memory address length of the memory space to a first pin according to the I/O type of the first pin and corresponding configuration states.

An exemplary embodiment of an IC product comprises at least a first pin, a second pin, a memory space with a continuous memory address, and an allocation unit. The allocation unit allocates a first memory address length of the memory space to a first pin according to the I/O type of the first pin and corresponding configuration states. Next, the allocation unit allocates a second memory address length of the memory space to a second pin according to I/O type of the second pin and corresponding configuration states. The second length of memory address is adjacent to the first length of memory address.

A detailed description is given in the following embodiments with reference to the accompanying drawings.

DESCRIPTION OF THE DRAWINGS

Embodiments of the invention can be more fully understood by reading the subsequent detailed description and examples of embodiments thereof with reference made to the accompanying drawings, wherein.

DETAILED DESCRIPTION

Memory space allocation methods and IC products utilizing the same will now be described in detail.

Figure 1:
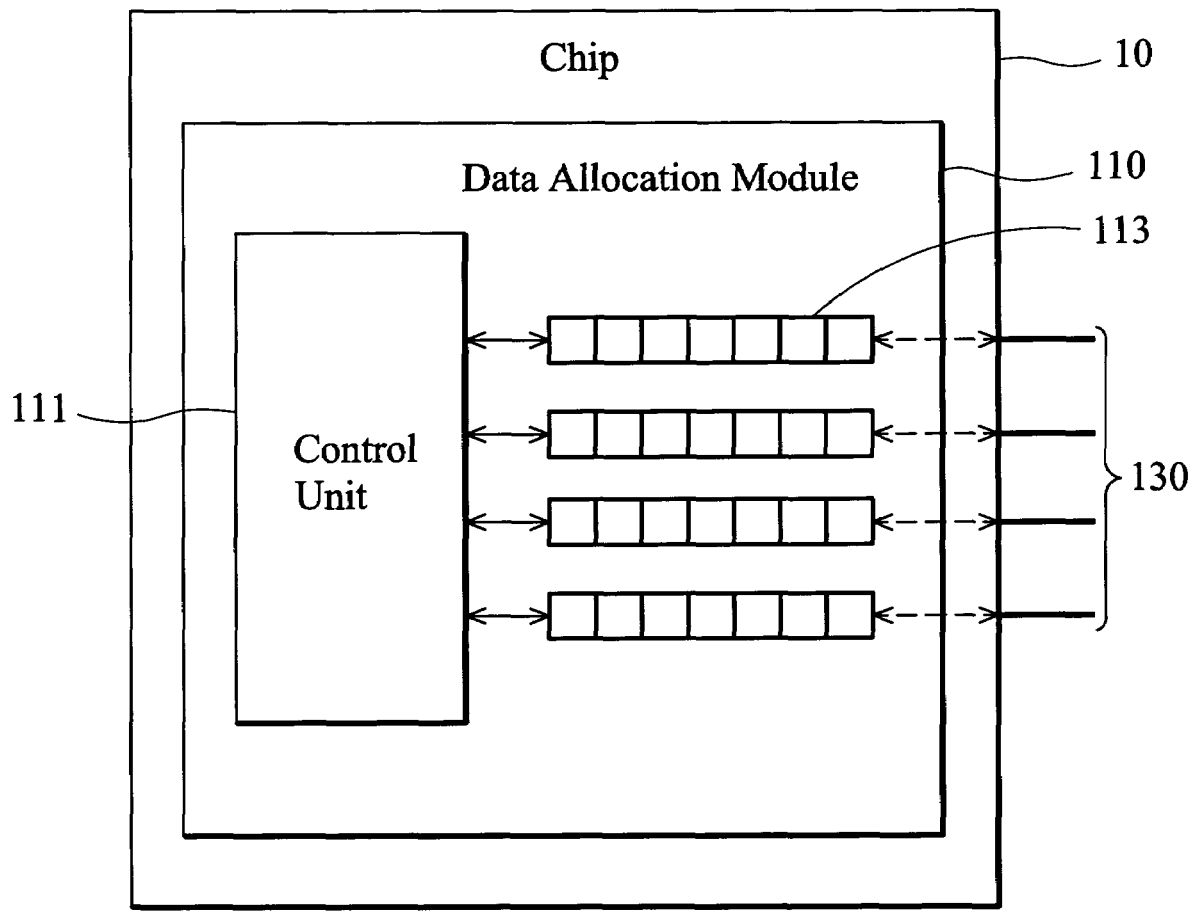
FIG. 1 is a schematic diagram of memory space configuration in a conventional IC design.
Figure 2:
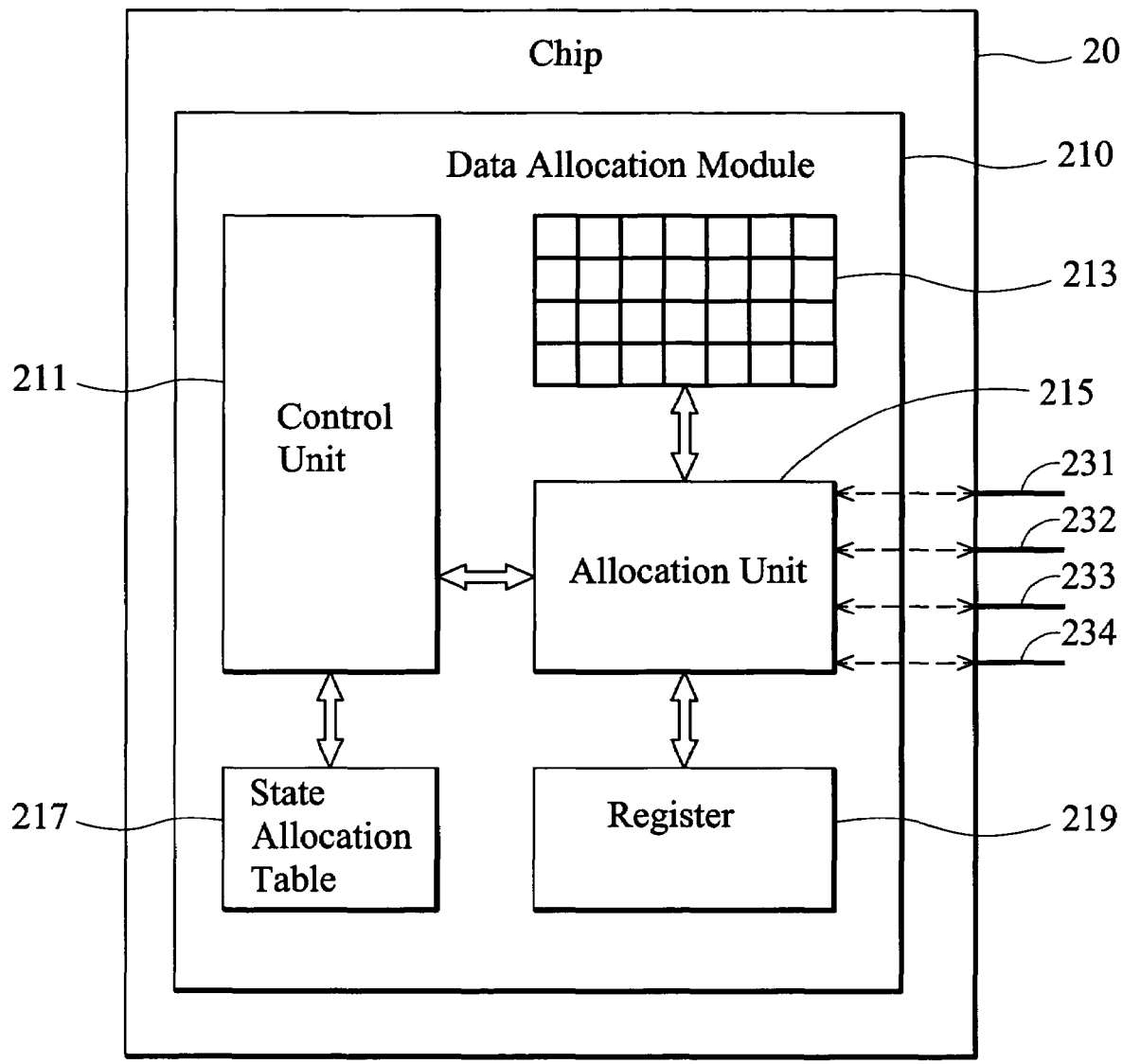
FIG. 2 is a schematic diagram of the architecture of the IC product made by an embodiment of a method for memory space allocation.

FIG. 2 is a schematic diagram of the architecture of the IC product made by an embodiment of a method for memory space allocation. A chip 20 comprises a data configuration module 210 and pins 231~234. Data configuration module 210 comprises a control unit 211, a memory space with a continuous memory address 213, an allocation unit 215, a state allocation table 217, and a register 219.

A plurality of Input/Output (I/O) types of each of the pins 231~234 and a plurality of configuration states corresponding to the I/O types of each pin are first defined. Each I/O type corresponds to each configuration state. The configuration states comprise, for example, empty-allocation, half-allocation, full-allocation, and over-allocation states. If one allocation state of a pin is "empty-allocation state", no memory space is allocated to the pin. If the allocation state of the pin is "half-allocation state", an 8-bit memory space is allocated to the pin. If the allocation state of the pin is "full-allocation state", a 16-bit memory space is allocated to the pin. If the allocation state of the pin is "over-allocation state", a 24-bit memory space is allocated to the pin. Further, different data amounts are obtained according to I/O types in accordance with various applications, and an appropriate memory space should be allocated to a pin in accordance with an obtained data amount. The I/O types and corresponding allocation states of pins 231~234 are stored in state allocation table 217.

Next, software or firmware management chip 20 determines an I/O type of pin 231 and enables control unit 211 to obtain an allocation state ("full-allocation state" for example) of pin 231 according to the determined result and state allocation table 217. Control unit 211 transmits the allocation state of pin 231 to allocation unit 215, and allocation unit 215 allocates a first memory address length (16 bits for example) of memory space 213 and then registers a start address and length of the first memory address length in register 219.

Next, the software or firmware managing chip 20 determines an I/O type of pin 232 and enables control unit 211 to obtain the allocation state ("half-allocation state" for example) of pin 232 according to the determined result and state allocation table 217. Control unit 211 transmits the allocation state of pin 232 to allocation unit 215, and allocation unit 215 allocates a second memory address length (8 bits for example) of memory space 213 and then registers a start address and length of the second memory address length in register 219. Start addresses and memory addresses lengths allocated to pins 233 and 234 are thus obtained using the described method and registered in register 219. Allocation unit 215 can also access the data stored in memory space 213.

Figure 3:
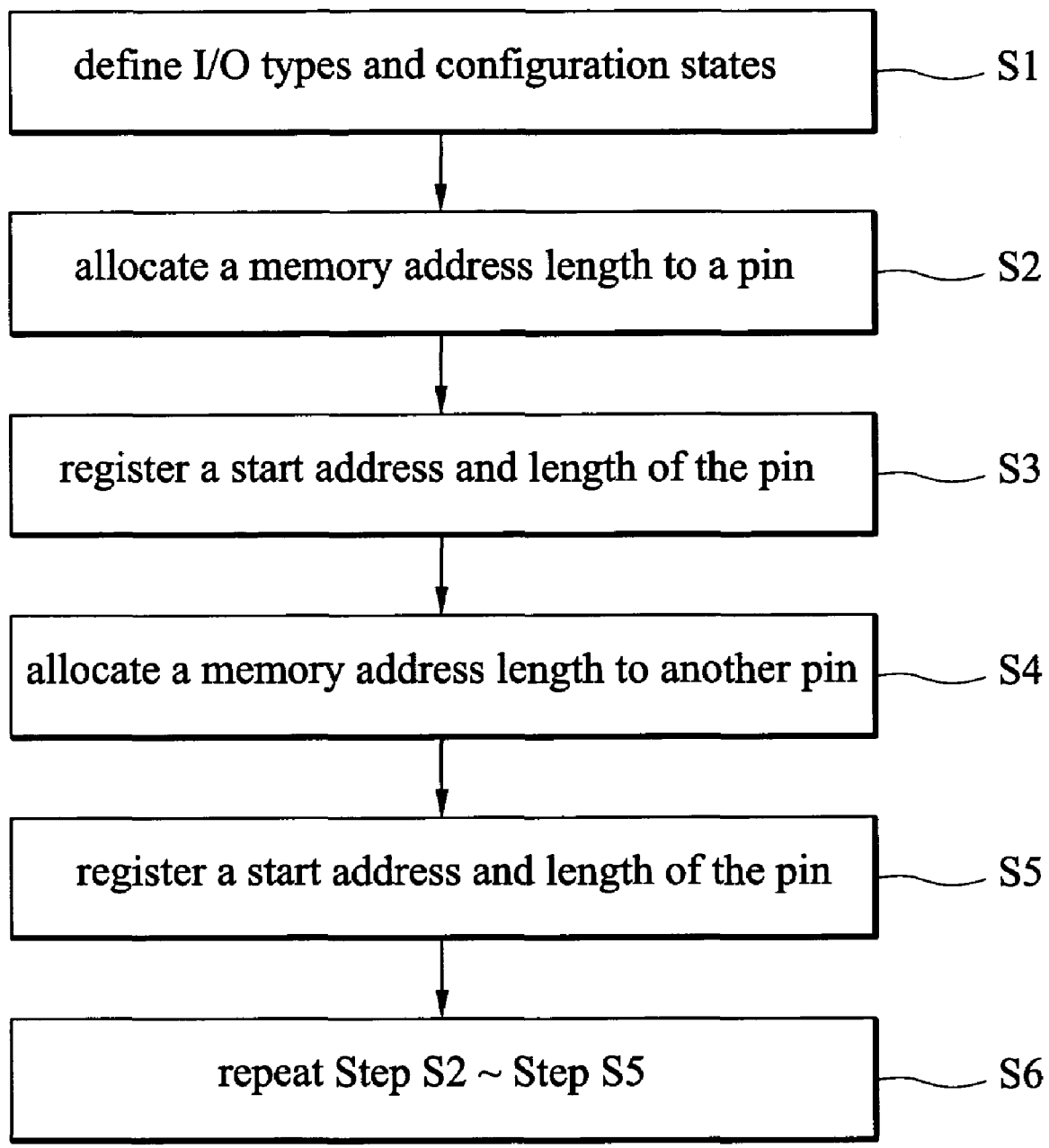
FIG. 3 is a flowchart of an embodiment of a method for memory space allocation.

FIG. 3 is a flowchart of an embodiment of a method for memory space allocation.

A plurality of I/O types of each of a plurality of pins and a plurality of configuration states corresponding to the I/O types of the each pin are defined (step S1). Each I/O type corresponds to each configuration state. A first memory address length of the memory space is allocated to a pin according to the I/O type thereof and corresponding configuration states (step S2). A start address of the first memory address length is a start address of the memory space, and the start address and a length of the first length of memory address is registered in a register (step S3). Next, a second length of memory address of the memory space is allocated to another pin according to I/O types thereof and configuration states corresponding to the I/O types of the pin (step S4). The second length of memory address is adjacent to the first length of memory address. A start address and length of the second length of memory address is registered in the register (step S5). Additionally, step S2 to step S5 are repeatedly executed until each pins is allocated with a length of memory address (step S6).

In some embodiments, a fixed memory address length of a memory space with a continuous memory address to each pin of a chip is allocated in accordance with an obtained data amount, preventing potentially misallocated or idle memory space and enhancing utility rate of the memory space.

Although the present invention has been described in preferred embodiments, it is not intended to limit the invention to the precise embodiments disclosed herein. Those who are skilled in this technology can still make various alterations and modifications without departing from the scope and spirit of this invention. Therefore, the scope of the present invention shall be defined and protected by the following claims and their equivalents.

What is claimed is:

1. A method for memory space allocation, comprising:
   providing a memory space with a contiguous memory address range;
   allocating a first memory address length of the memory space to a first pin according to a data amount obtained through the first pin; and
   allocating a second memory address length of the memory space to a second pin according to a data amount obtained through the second pin,
   wherein the first memory address length is different from the second memory address length when the data amount obtained through the first pin is different from the data amount obtained through the second pin.

2. The method as claimed in claim 1, wherein a start address of the first memory address length is a start address of the memory space.

3. A method for memory space allocation, comprising:
   defining a plurality of I/O types of each of a plurality of pins and a plurality of configuration states corresponding to the I/O types of each pin;
   providing a memory space with a contiguous memory address range; and
   allocating a first memory address length of the memory space to a first pin according to I/O types of the first pin and corresponding configuration states,
   wherein the memory address length allocated to each of the plurality of pins is different from each of the other pins when I/O types and corresponding configuration states of each of the plurality of pins are different from the I/O types and corresponding configuration states of the other pins.

4. The method as claimed in claim 3, wherein a start address of the first memory address length is a start address of the memory space.

5. The method as claimed in claim 4, further comprising providing a register, registering a start address and length of the first memory address length.

6. The method as claimed in claim 5, further comprising allocating a second memory address length of the memory space to a second pin according to I/O types of the second pin, configuration states corresponding to the I/O types of the second pin, and contents stored in the register, wherein the second memory address length is adjacent to the first memory address length.

7. The method as claimed in claim 3, wherein the configuration states comprise empty-allocation, half-allocation, full-allocation, and over-allocation states.

8. The method as claimed in claim 7, wherein 0-bit, 8-bit, 16-bit, and 24-bit memory addresses are allocated respectively according to the empty-allocation, half-allocation, full-allocation, and over-allocation states.

9. An IC product made of a method for memory space allocation, comprising at least one first pin and second pin, comprising:
   a memory space with a contiguous memory address range; and
   an allocation unit, allocating a first memory address length of the memory space to the first pin according to I/O type of the first pin and corresponding configuration states, and allocating a second memory address length of the memory space to the second pin according to I/O type of the second pin and corresponding configuration states, wherein the second memory address length is adjacent to the first memory address length,
   wherein the first memory address length is different from the second memory address length when the I/O type of the first pin is different from the I/O type of the second pin.

10. The IC product as claimed in claim 9, further comprising providing a register, registering start addresses and lengths of the first memory address length and second memory address length.

11. The IC product as claimed in claim 9, further comprising:
    a state allocation table, storing a plurality of I/O types of each of a plurality of pins and a plurality of configuration states corresponding to the I/O types of each pin; and
    a control unit, obtaining the I/O type of a pin and corresponding configuration state, and enabling the allocation unit to allocate memory according to the allocation states.

12. The IC product as claimed in claim 11, wherein the configuration states comprise empty-allocation, half-allocation, full-allocation, and over-allocation states.

13. The IC product as claimed in claim 12, wherein 0-bit, 8-bit, 16-bit, and 24-bit memory addresses are allocated respectively according to the empty-allocation, half-allocation, full-allocation, and over-allocation states.

* * * * *